United States Patent
Ma

(10) Patent No.: US 7,187,739 B2
(45) Date of Patent: Mar. 6, 2007

(54) TIMING RECOVERY CIRCUIT

(75) Inventor: Ching-Wen Ma, Nantou (TW)

(73) Assignee: Via Technologies, Inc., Taipei (TW)

( * ) Notice: Subject to any disclaimer, the term of this patent is extended or adjusted under 35 U.S.C. 154(b) by 752 days.

(21) Appl. No.: 10/438,875

(22) Filed: May 16, 2003

(65) Prior Publication Data

US 2003/0215036 A1 Nov. 20, 2003

(30) Foreign Application Priority Data

May 20, 2002 (TW) .............................. 91110548 A

(51) Int. Cl.
*H04L 7/00* (2006.01)
(52) U.S. Cl. .................................................. 375/355
(58) Field of Classification Search ................ 375/355, 375/362, 371, 373–376; 327/156, 160
See application file for complete search history.

(56) References Cited

U.S. PATENT DOCUMENTS

| | | | |
|---|---|---|---|
| 5,235,622 A * | 8/1993 | Yoshida | 375/355 |
| 6,128,357 A * | 10/2000 | Lu et al. | 375/355 |
| 6,504,869 B2 * | 1/2003 | Yedid | 375/232 |
| 6,529,549 B1 * | 3/2003 | Norrell et al. | 375/229 |
| 6,667,640 B2 * | 12/2003 | Asano | 327/147 |

* cited by examiner

*Primary Examiner*—Khanh Tran
(74) *Attorney, Agent, or Firm*—Rabin & Berdo, P.C.

(57) ABSTRACT

A timing recovery circuit and related method is disclosed. The timing recovery circuit encompasses a converter, an interpolator, a phase error detector, an adjustment circuit, and a calculation circuit. The converter samples an input signal to generate an intermediate signal carrying samples of the input signal, while the interpolator inserts an interpolating sample into the intermediate signal in response to a control value to generate an output signal. The phase error detector outputs a phase error of the output signal. The adjustment circuit updates an over-sampling ratio according to a pair of first and second thresholds, and a counting value adjusted in response to the phase error and a median reference value. Finally, the calculation circuit derives the control value from the updated over-sampling ratio, and transferring the control value to the interpolator.

12 Claims, 4 Drawing Sheets

TIMING RECOVERY CIRCUIT

BACKGROUND OF THE INVENTION

1. Field of the Invention

The present invention relates to a timing recovery circuit, and particularly to a timing recovery circuit and a method thereof which avoids a steady estimation error of the frequency and phase resulting from rounding-off imprecision of digital processing.

2. Description of the Prior Art

There are signals transmitted from a transmission end to a receiving end in digital processing or communication systems. Basically, the signals received on the receiving end must be synchronized with those from the transmission end to eliminate the frequency and phase errors generated in the transmission channel. Further, there is always a difference between the sampling rates of the digital signals on the transmission and receiving ends since the circuitries on these two ends are independent of each other. Therefore, there must be a timing recovery means working on the sampling frequency and phase for signal synchronization.

FIG. 1 is a diagram showing a conventional timing recovery circuit 1, which includes an analog-to-digital converter (ADC) 11, an interpolator 12, a phase error detector 13, an over-sampling ratio (OSR) adjustment circuit 14 and a MU calculation circuit 15. The analog-to-digital converter 11 samples a received analog signal r(t) at a sampling rate provided by a clock signal CLK. The digital signal output from the analog-to-digital converter 11 is usually asynchronized since there is a difference between the symbol rate of the signal r(t) and that of the analog-to-digital converter 11. The interpolator 12 processes the signal output from the ADC 11 for signal synchronization so that interpolating samples can be derived and inserted into the asynchronous signal. Basically, timing of the interpolating sample insertions is determined by a control value MU (μ). The synchronized signal output from the interpolator 12 is fed to the phase error detector 13 to detect and output a phase error PhaseErr. Initially, the OSR adjustment circuit 14 outputs an initial over-sampling ratio, which is a ratio of the sampling rate of the ADC 11 to the data rate. As the phase error PhaseErr is generated and output by the phase error detector 13, the OSR adjustment circuit 14 derives a new over-sampling ratio by the following equation:

$$OSR(k)=OSR(k-1)+k2*\text{PhaseErr}, \quad \text{(eq. 1)}$$

wherein k2 is a constant and k is the order. The MU calculation circuit 15 derives the control value MU by using the following equation:

$$MU(k)=MU(k-1)+OSR(k)-1+\text{PhaseErr}*k1, \quad \text{(eq. 2)}$$

wherein k1 is a constant.

Thus, the timing recovery circuit 1 generates an output signal with synchronized frequency and phase via the closed loop formed by the phase error detector 13, OSR adjustment circuit 14 and MU calculation circuit 15.

For the sake of cost, floating point numbers is not practically used for the phase error, OSR and control value MU. Instead, fixed point numbers are typically used, which obviously results in rounding-off imprecision.

FIG. 2 is a diagram showing phase error values that changes as a function of time when the floating point numbers are used. The OSR converges onwards a true OSR, and thus the average value of the phase error within any short time period is theoretically zero since the phase error is actually a white noise.

FIG. 3 is a diagram showing the phase error values changing as a function of time when the fixed point numbers are used. Since the phase error are wobbling alone the zero line, only the average value of the phase error within a relatively long time period approaches zero rather than within a short time period.

Accordingly, in the conventional timing recovery circuit, the phase error increases successively rather than decreases due to the rounding error, which indicates that a relatively long time period is required for reducing the phase error. Moreover, the phase of the synchronized signal swings around the correct one, which makes the OSR or sampling rate of the ADC swing in the same way.

SUMMARY OF THE INVENTION

The object of the present invention is to provide a timing recovery circuit and a method thereof which avoids a steady estimation error of the frequency and phase resulting from rounding-off imprecision of digital processing.

The present invention provides a timing recovery circuit comprising a converter, an interpolator, a phase error detector, an adjustment circuit, and a calculation circuit. The converter samples an input signal to generate an intermediate signal carrying samples of the input signal. The interpolator derives and inserts interpolating samples into the intermediate signal in response to a control value to generate an output signal. The phase error detector outputs a phase error of the output signal. The adjustment circuit outputs an over-sampling ratio according to a pair of first and second thresholds, a counting value and a median reference value, wherein the counting value is adjusted in response to the phase error. The calculation circuit derives the control value from the over-sampling ratio and phase error and transfers the control value to the interpolator.

The present invention further provides a method for timing recovery comprising the steps as follows. An input signal is firstly sampled to generate an intermediate signal carrying samples of the input signal. Next, interpolating samples are inserted into the intermediate signal to generate an output signal in response to a control value, while a phase error of the output signal is then detected and output. Thereafter, an over-sampling ratio is adjusted according to the phase error. A counting value is firstly adjusted according to a comparison result between the phase error and a reference value. This counting value is increased when the phase error is larger than the reference value, while the counting is decreased when the phase error is smaller than the reference value. Then, the over-sampling ratio is adjusted by comparing the counting value with a pair of first and second thresholds. Finally, a new control value can be obtained by using the new derived over-sampling ratio.

BRIEF DESCRIPTION OF THE DRAWINGS

The present invention will become more fully understood from the detailed description given hereinbelow and the accompanying drawings, given by way of illustration only and thus not intended to be limitative of the present invention.

DETAILED DESCRIPTION OF THE INVENTION

Figure 4:
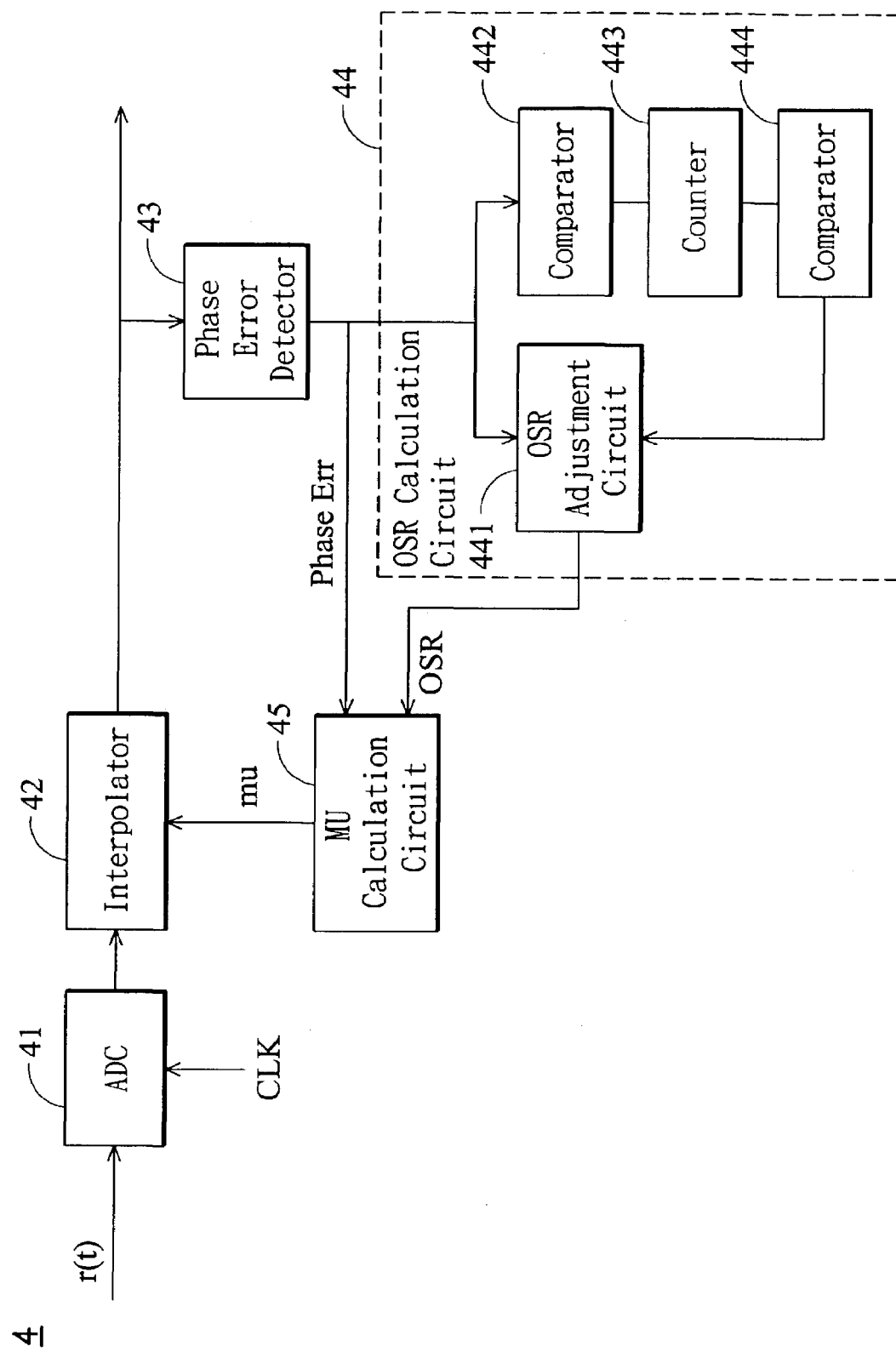
FIG. 4 is a diagram showing a timing recovery circuit according to one embodiment of the invention.

FIG. 4 is a diagram showing a timing recovery circuit according to one embodiment of the invention. The timing recovery circuit 4 includes an analog-to-digital converter (ADC) 41, an interpolator 42, a phase error detector 43, an over-sampling ratio (OSR) adjustment circuit 44 and a MU calculation circuit 45. The analog-to-digital converter 41 samples a received analog signal r(t) at a sampling rate provided by a clock signal CLK. The digital signal output from the analog-to-digital converter 41 is not synchronized since there is a difference between the symbol rate of the signal r(t) and that of the analog-to-digital converter 41. The interpolator 42 receives the signal output from the ADC 41 and generates interpolating samples for signal synchronization purpose. These interpolating samples are then inserted into the aforementioned asynchronized signal according to a control value MU. The synchronized signal output from the interpolator 42 is fed to the phase error detector 43 to detect and output a phase error PhaseErr.

Figure 1:
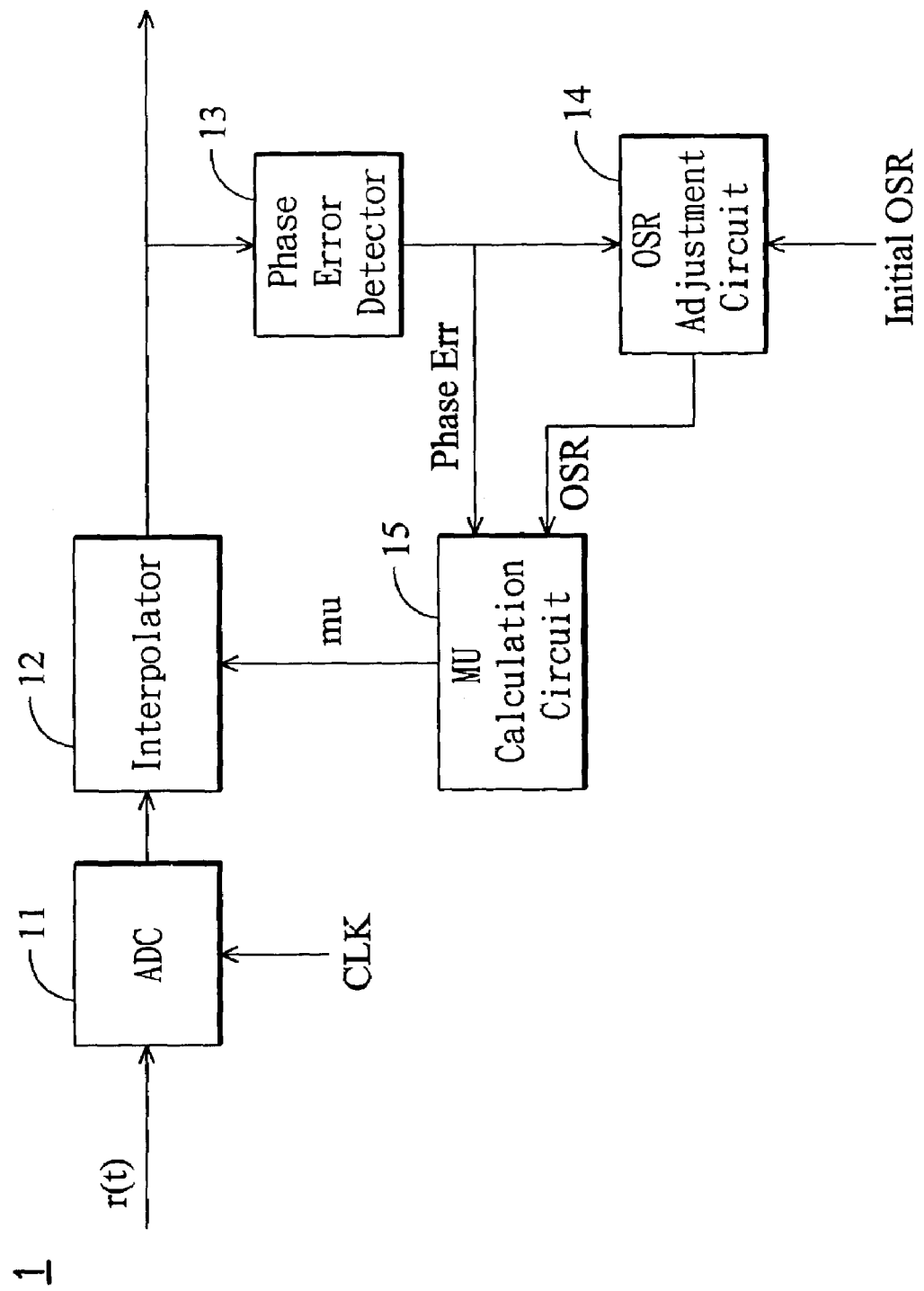
FIG. 1 is a diagram showing a conventional timing recovery circuit.
Figure 2:
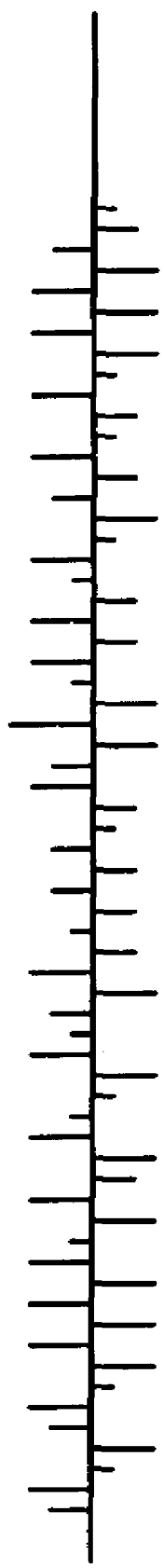
FIG. 2 is a diagram showing values of the phase error variations as a function of time when the floating point numbers are used.
Figure 3:
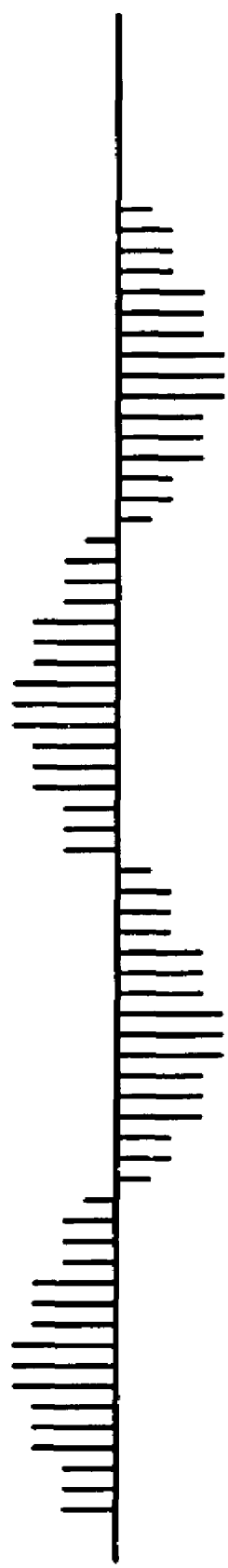
FIG. 3 is a diagram showing values of the phase error variations as a function of time when the fixed point numbers are used.

The adjustment circuit 44 includes an OSR calculation circuit 441 (analogous to the OSR adjustment circuit 14 in FIG. 1), comparators 442 and 444, and a counter 443, wherein the comparator 442 also pre-stores a median reference value (0 for example). When the phase error is larger than (or at least equal to) the median reference value, the comparator 442 outputs a logic 1 (usually indicates by using a high voltage level), and the comparator 442 outputs a logic 0 (usually indicates by using a low voltage level) when the phase error is smaller than the median reference value. The counter 443 outputs a counting value according to the logic value output from the comparator 442. When a logic 1 is delivered by the comparator 442, the counter 443 increases the counting value stored therein, while the counter 443 decreases the counting value when a logic 0 is delivered by the comparator 442. The comparator 444 pre-stores a pair of first and second thresholds (3 and −3 for example), which are used to compare with the counting value received from the counter 443. The OSR calculation circuit 441 pre-stores a correction value (A for example). The OSR calculation circuit 441 outputs an initial OSR in the beginning. As the phase error is fed back, the OSR calculation circuit 441 starts to update and output new OSRs sequentially. When the counting value is between the first and second thresholds, the new OSR is derived by using the following equation:

$$OSR(k)=OSR(k-1)+k2*\text{PhaseErr}, \quad (\text{eq. 3})$$

wherein k2 is a constant and k is the order. Otherwise, the OSR calculation circuit 441 outputs a new OSR (i.e. OSR(k)) derived by subtracting the correction value from the old OSR (i.e. OSR(k−1)) when the counting value is larger than the first threshold. Moreover, the OSR calculation circuit 441 outputs a new OSR derived by adding the correction value to the old OSR when the counting value is smaller than the second threshold. The MU calculation circuit 45 receives the phase error PhaseErr and the new OSR respectively from the phase error detector 43 and OSR adjustment circuit 44 to derive the control value MU by the following equation:

$$MU(k)=MU(k-1)+OSR(k)-1+\text{PhaseErr}*k1, \quad (\text{eq. 4})$$

wherein k1 is a constant.

Thus, the timing recovery circuit 4 generates an output signal with synchronized frequency and phase from the closed loop formed by the phase error detector 43, OSR adjustment circuit 44 and MU calculation circuit 45. Further, since there are counter and comparators in the OSR adjustment circuit 44, the phase error is forcedly adjusted when the phase error is continuously larger or smaller than the median reference value. In other word, the phase error can be corrected despite the rounding error when the phase error in the same direction is successively detected. Time-cost is significantly degraded due to the degraded phase error offered by the embodiment. The phase swings of the synchronized signal converges on the correct one, which also converges the OSR or sampling rate of the ADC.

Figure 5:
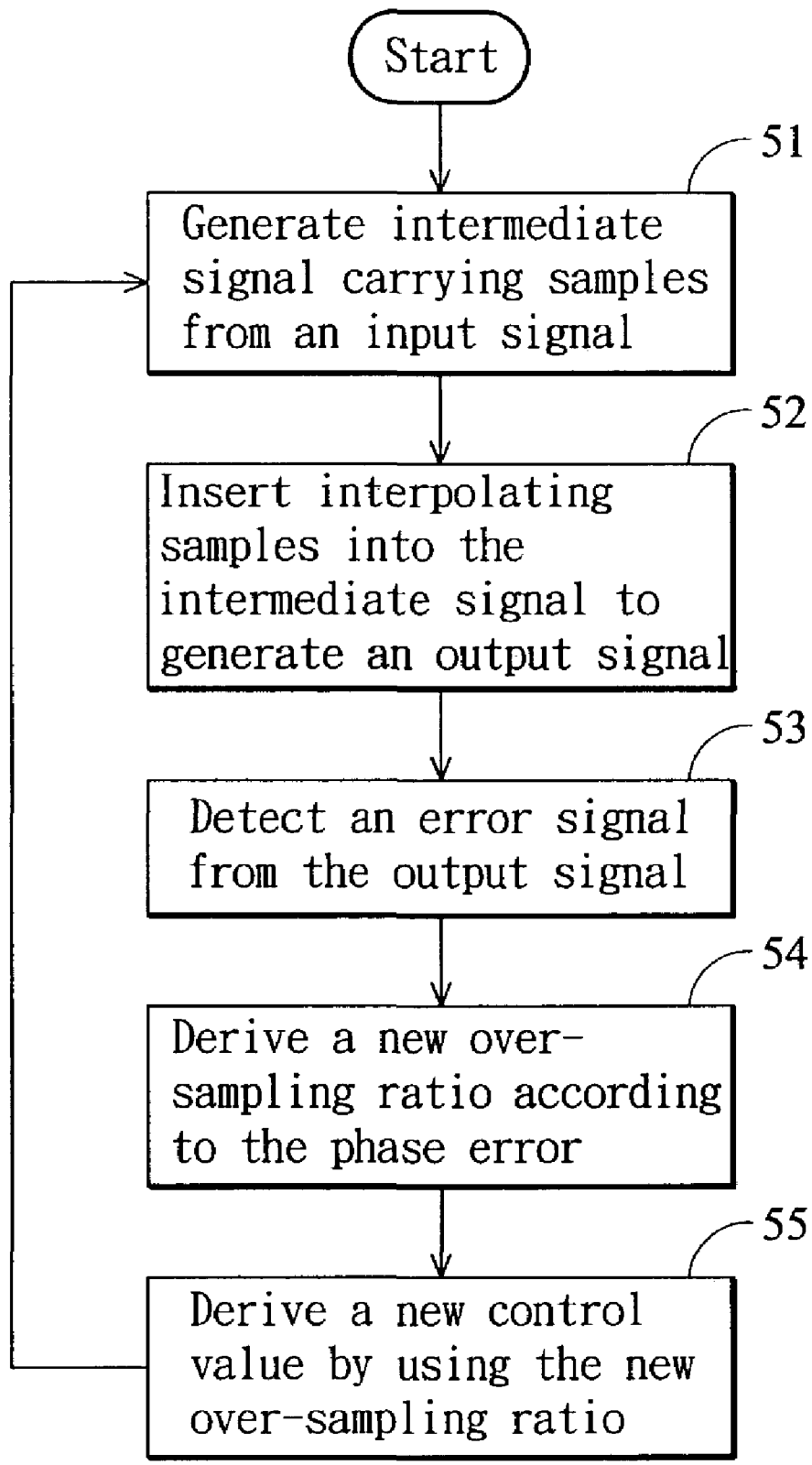
FIG. 5 is a flowchart of a method for timing recovery according to one embodiment of the invention.

FIG. 5 is a flowchart illustrative of the operating flow of the timing recovery according to one embodiment of the invention.

In step 51, an input signal is sampled to generate an intermediate signal carrying samples of the input signal.

In step 52, interpolating samples are inserted into the intermediate signal to generate an output signal in response to a control value.

In step 53, a phase error of the output signal is detected and output.

In step 54, an over-sampling ratio is adjusted according to the phase error by the following steps. A counting value is increased when the phase error is larger than a median reference value, and the counting value is decreased when the phase error is smaller than the median reference value. The over-sampling ratio is subtracted by a correction value when the counting value is larger than a first threshold, and the correction value is added to the over-sampling ratio when the counting value is smaller than a second threshold.

In step 55, the control value is obtained from the phase error and over-sampling ratio.

By repeating the previously steps 51~55, the phase and sampling frequency would converge on the true phase and sampling frequency instead of wobbling along the zero line even the fixed point numbers are employed. The output signal generated by the previously described method is precisely synchronized.

The disclosed timing recovery circuit can be established into any device which reads data from a storage medium. For example, any optical reproducing device which is used to reproduce data can employ the embodiment to read data from a disc. Those optical reproducing device can be a compact disk-read only memory (CD-ROM) drive, a digital versatile disk-read only memory (DVD-ROM) drive, a compact disk-rewritable (CD-RW) drive, a digital versatile disk-recordable (DVD-R) drive, a digital versatile disk-rewritable (DVD-RW) drive, or even a digital versatile disk-random access memory (DVD-RAM) drive.

The foregoing description of the preferred embodiments of this invention has been presented for purposes of illustration and description. Obvious modifications or variations are possible in light of the above teaching. The embodiments were chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. A timing recovery circuit comprising:
   a converter for sampling an input signal to generate an intermediate signal carrying samples of the input signal;
   an interpolator, responsive to a control value for inserting an interpolating sample into the intermediate signal to generate an output signal;
   a phase error detector for outputting a phase error of the output signal;
   an adjustment circuit for updating an over-sampling ratio in response to the phase error and a counting value which varies as a comparison result of the phase error and a reference value, the adjustment circuit including
      a first comparator for outputting a first value when the phase error is larger than the reference value, and for outputting a second value when the phase error is smaller than the reference value,
      a counter for outputting the counting value, wherein the counting value is increased when the first value is delivered from the first comparator, and the counting value is decreased when the second value is delivered from the first comparator,
      a second comparator for comparing the counting value with a first threshold and a second threshold, and
      a second calculation circuit for updating the over-sampling ratio by using the phase error when the counting value is between the first threshold and the second threshold, and for updating the over-sampling ratio by using a correction value when the counting value is not between the first threshold and the second threshold; and
      a first calculation circuit for deriving the control value from the updated over-sampling ratio and phase error, and for transferring the control value to the interpolator.

2. The timing recovery circuit as claimed in claim 1, wherein the over-sampling ratio is updated by subtracting the correction value from a currently used over-sampling ratio when the counting value is larger than the first threshold.

3. The timing recovery circuit as claimed in claim 1, wherein the over-sampling ratio is updated by adding the correction value to the currently used over-sampling ratio when the counting value is smaller than the second threshold.

4. The timing recovery circuit as claimed in claim 1, wherein the timing recovery circuit is established in an optical reproducing device for reading a data from a disc, the optical reproducing device is a compact disk-read only memory (CD-ROM) drive, a digital versatile disk-read only memory (DVD-ROM) drive, a compact disk-rewritable (CD-RW) drive, a digital versatile disk-recordable (DVD-R) drive, a digital versatile disk-rewritable (DVD-RW) drive, or a digital versatile disk-random access memory (DVD-RAM) drive.

5. An adjustment circuit of a timing recovery circuit comprising:
   a first comparing means for outputting a logic value in response to a phase error of an output signal generated by the timing recovery circuit, wherein the logic value indicates a first value when the phase error is larger than a reference value and the logic value indicates a second value when the phase error is smaller than the reference value;
   a counting means for varying a counting value in response to the logic value from the comparing means, wherein the counting value is increased when the first value is delivered from the first comparing means, and the counting value is decreased when the second value is delivered from the first comparing means;
   a second comparing means for comparing the counting value with a first threshold and a second threshold; and
   an OSR updating means for updating an over-sampling ratio (OSR) by using the phase error when the counting value is between the first threshold and the second threshold, and for updating the over-sampling ratio by using a correction value when the counting value is not between the first threshold and the second threshold.

6. The adjustment circuit as claimed in claim 5, the over-sampling ratio is updated by subtracting the correction value from a currently used over-sampling ratio when the counting value is larger than the first threshold.

7. The adjustment circuit as claimed in claim 5, wherein the over-sampling ratio is updated by adding the correction value to the currently used over-sampling ratio when the counting value is smaller than the second threshold.

8. The adjustment circuit as claimed in claim 5, wherein the timing recovery circuit is established in an optical reproducing device for reading a data from a disc, the optical reproducing device is a compact disk-read only memory (CD-ROM) drive, a digital versatile disk-read only memory (DVD-ROM) drive, a compact disk-rewritable (CD-RW) drive, a digital versatile disk-recordable (DVD-R) drive, a digital versatile disk-rewritable (DVD-RW) drive, or a digital versatile disk-random access memory (OVO-RAM) drive.

9. A method for adjusting an over-sampling ratio of a timing recovery circuit comprising the steps of:
   adjusting a counting value according to a comparison result of the phase error and a reference value; and
   adjusting the over-sampling ratio according to the counting value, a first threshold and a second threshold, and a phase error of an output signal generated by the timing recovering circuit, wherein the over-sampling ratio is updated by using the phase error when the counting value is between a first threshold and a second threshold, and for updating the over-sampling ratio by using a correction value when the counting value is not between the first threshold and the second threshold.

10. The method as claimed in claim 9, wherein the over-sampling ratio is updated by subtracting the correction value from a currently used over-sampling ratio when the counting value is larger than the first threshold.

11. The method as claimed in claim 9, wherein the over-sampling ratio is updated by adding the correction value to the currently used over-sampling ratio when the counting value is smaller than the second threshold.

12. The method as claimed in claim 9, wherein the timing recovery circuit is established in an optical reproducing device for reading a data from a disc, the optical reproducing device is a compact disk-read only memory (CD-ROM) drive, a digital versatile disk-read only memory (DVD-ROM) drive, a compact disk-rewritable (CD-RVV) drive, a digital versatile disk-recordable (DVD-R) drive, a digital versatile disk-rewritable (DVD-RW) drive, or a digital versatile disk-random access memory (DVD-RAM) drive.

* * * * *